United States Patent
Cather

[15] 3,683,541
[45] Aug. 15, 1972

[54] WEED GUARD FOR THE HOOKS OF A TREBLE HOOK

[72] Inventor: Robert L. Cather, 594 Pardee St., Easton, Pa. 18042

[22] Filed: Aug. 4, 1970

[21] Appl. No.: 60,844

[52] U.S. Cl. ...................43/43.4, 43/42.04, 43/42.1, 43/42.43
[51] Int. Cl. .............................................A01k 83/00
[58] Field of Search..........43/43.4, 44.82, 43.2, 43.6, 43/54.5, 57.5, 42.1, 42.04, 42.24, 42.4, 42.43

[56] References Cited

UNITED STATES PATENTS

| | | | |
|---|---|---|---|
| 2,771,704 | 11/1956 | Biggs | 43/43.2 X |
| 2,482,881 | 9/1949 | Sonner, Jr. | 43/43.2 UX |
| 3,363,357 | 1/1968 | Sokol | 43/57.5 R X |
| 2,623,321 | 12/1952 | Braukus | 43/57.5 R UX |
| 2,703,945 | 3/1955 | Johnson | 43/42.1 X |
| 3,121,969 | 2/1964 | Cuttino | 43/42.1 |
| 3,170,756 | 2/1965 | Butler | 43/42.1 X |

FOREIGN PATENTS OR APPLICATIONS 1,248,602   11/1960   France......................43/42.1

Primary Examiner—Samuel Koren
Assistant Examiner—James H. Czerwonky
Attorney—J. Harold Kilcoyne

[57] ABSTRACT

A weed guard serving the plural hooks of a conventional treble or "gang" hook comprising a flexible, normally planiform disc of a thin plastic sheet material. The disc has a diameter greater by a predetermined small amount than that of the radial extent of the hook points, a central hole for the passage therethrough of the shank or shaft of the treble hook of a size which enables the disc to ride more or less loosely up and down said shank, and an outer-edge portion which is highly flexible and readily penetrable by any one or all of the hook points on which the disc normally rests and seats as the lure following a cast is being retrieved. The outer-edge portion has a multiplicity of closely spaced short-length slits which extend non-radially from its outer edge a short distance into the body portion of said disc and its body portion is provided with a preferably non-radial cut extending from its outer edge to the edge of its aforesaid central hole. The disc is then sealed closed about the hook shank or shaft by an adhesive element.

10 Claims, 5 Drawing Figures

Patented Aug. 15, 1972 3,683,541
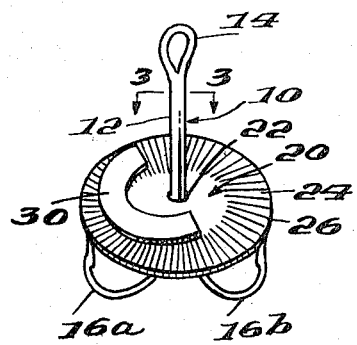
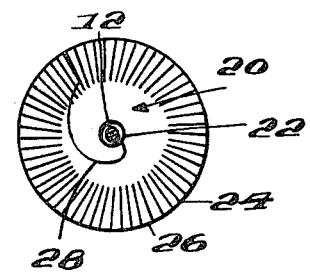
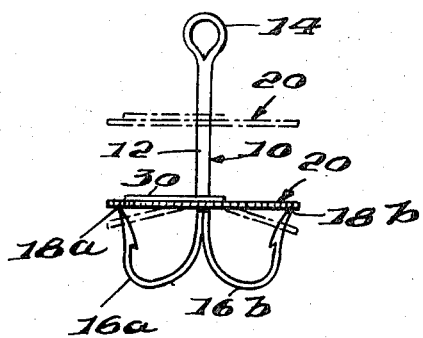
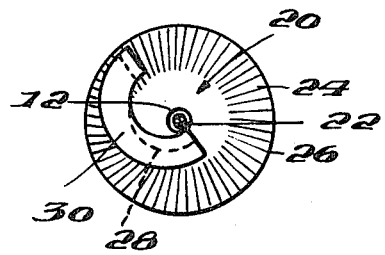
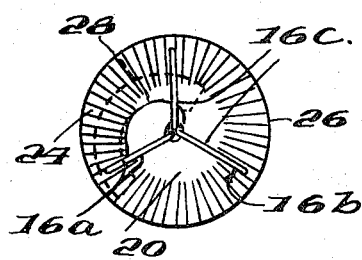
INVENTOR
ROBERT L. CATHER,
BY
ATTORNEY

WEED GUARD FOR THE HOOKS OF A TREBLE HOOK

BACKGROUND OF THE INVENTION

While numerous kinds and forms of weed guards for the plural hooks of a treble or "gang" hook of the type commonly used on or with floating or submersible fishing lures have been suggested and/or made available to the sport fisherman desirous of trying his luck in waters containing weed beds, lily pads and like marine growth, such have not met with popular favor for various and sundry reasons. More particularly, weed guards of the wire-finger type as disclosed, for example, in the now expired U.S. Pat. No. 2,473,564, dated June 21, 1949, were not only expensive in their fabrication, being in fact a precision device, but also their construction was such as to necessitate their permanent attachment to the shank or shafts of the treble hooks for which they were designed, rather than their attachment only when and if desired to the shank or shaft of an existing treble hook.

In apparent recognition of the need for an inexpensive weed guard for the plural hooks of a treble hook which could be attached as needed and then disposed of when the need therefor has been satisfied, numerous non-wire, i.e. plastic and/or rubber, types of weed guard were suggested, of which the weed guards as disclosed in U.S. Pats. Nos. 2,589,435, dated Mar. 18, 1952 (expired), and 3,170,756, dated Feb. 23, 1965, are representative. Speaking generally, however, the rubber or plastic weed guards according to the aforementioned and similar patents were open to the more serious objection that their design required attachment to a treble hook in a precise position of orientation about the shank or shaft thereof, which had to be maintained throughout successive casts and retrieving operations if the weed guard was to perform its intended function.

It was also found that certain makes of prior rubber or plastic weed guards, although capable to a degree of diverting weeds away from the plural hooks of a treble hook, were so constructed that they affected the action of the lure when being retrieved in open water or were otherwise objectionable in that they were readily visible in water to the extent of detracting from the lure itself.

STATEMENT OF THE INVENTION

Briefly, the present invention contemplates and provides a highly effective weed guard capable of serving each and all of the plural (usually three) hooks of a conventional treble or "gang" hook of the type carried by floating or submersible lures, which is characterized by a design enabling its fabrication in quantity from sheet plastic, as by a simple, readily practiced stamping-out operation; which is so constructed and arranged that it can be quickly yet securely affixed to the shank or shaft of a treble hook in weed-guarding relation to the plural hooks thereof; and which, more importantly, is not required to be attached in any particular position of orientation about the hook shank or shaft axis.

More particularly, a weed guard for the plural hooks of a treble or "gang" hook according to the invention comprises a normally planiform disc stamped or otherwise fabricated from a thin plastic sheet material such as clear vinyl. To enable such a plastic disc to perform as intended, its outer-edge diameter is somewhat greater than that of the hook-point circle, and it is provided with a central hole for the passage of the hook shank therethrough and which is slightly oversize with respect to the thickness of diameter of said shank. Thus the disc is free to ride or move loosely up and down the hook shank although, because of its diameter being greater than that of the hook-point circle, it will normally rest on said hook points, and furthermore it will seat on same as the lure to which the treble hook is attached is drawn through the water in a so-called retrieval operation. It is a further important feature of the invention that the outer edge or skirt portion of the planiform disc is rendered highly flexible and readily penetrable by any one of the hook points when the hook is taken by a fish, by the simple expedient of providing the disc with a plurality of inwardly directed, short-length and non-radial slits which extend from the outer edge a short distance into the body portion of said disc.

To enable a planar-disc form of weed guard as herein proposed to be supplied and used as an attachment to an existing or already-in-use treble hook hung from or otherwise incorporated in a floating or submersible lure, the body portion of the disc is cut apart preferably along a nonradial line which extends from its outer edge to the edge of its central hole. Such permits the disc to be attached as needed to a treble hook, by spreading the disc apart and re-closing same about the hook shank. A sealing element also supplied with the plastic disc is then applied to the surface thereof so as to seal the disc closed about the shaft, whereupon the fisherman may make his cast in the usual manner, without the disc changing the operation of the lure and, by virtue of its being made of clear plastic sheet material, being invisible to the fish.

DESCRIPTION OF THE DRAWING

The invention will now be described in detail in connection with the appended drawing which illustrates a preferred embodiment of a weed guard as herein contemplated and provided "attached" to a treble hook, which latter is shown apart form the lure from which it is hung or otherwise associated or incorporated. In said drawing FIG. 1 is a perspective view of a weed guard as herein proposed attached to a treble hook;

FIG. 2 is a side elevation of the hook and weed guard assembly, in which the weed guard is shown in full lines in its normal or "at rest" position, in which it is supported on the barbed points of the three equidistantly spaced-apart hooks of a treble or gang hook;

FIG. 3 is a section taken along line 3—3 of FIG. 1, showing a weed-guarding disc of the invention following its attachment to a treble hook already in use, but prior to sealing same reclosed about the hook shank;

FIG. 4 is a view similar to FIG. 3 showing the weed guard attached and sealed as in FIGS. 1 and 2; and FIG. 5 is a plan view of a treble hook with weed guard assembled or attached thereto, taken from the under side of the assembly.

DETAILED DESCRIPTION

Referring to the drawing, numeral 10 generally designates a conventional treble or "gang" hook comprising an elongated, straightway extending shank or shaft 12 which is provided with an eye 14 at one (upper) end, by means of which said hook may be secured to a fish lure (not shown), and whose other end carries three individual fish hooks designated 16a, 16b, 16c which are spaced 120° apart and terminate outwardly in barbed points 18a, 18b, 18c disposed on a circle and at approximately the same level.

While a weed guard 20 as herein contemplated and provided is shown as "attached" to said treble hook 10, it is intended that weed guards of the invention will be produced in quantity and sold separately form the lure in lots of, say, six or twelve, for attachment as needed or considered to be needed to the treble hooks of lures already in use, by a fisherman desiring to cast in waters containing weed beds, lily pads, etc., and subsequently to be stripped or detached from the treble hook when the need therefor appears to have been satisfied.

More particularly, said weed guard 20 of the invention comprises a preferably circular, normally planiform disc stamped or otherwise fashioned form a thin plastic sheet material such as clear vinyl. As shown particularly in FIGS. 1, 2 and 5, the outer-edge diameter of said disc is greater than that of the circle of the hook points 18a, 18b, 18c, and said disc is moreover provided with a central hole 22 for the passage therethrough of the shank or shaft 12 of the treble hook 10, as earlier described. Thus, the plastic-material disc 20, by virtue of its being generally planiform and having outer-edge diameter greater than that of the hook point circle, will normally assume a "rest" position in which it is supported at three points along its outer-edge portion on the three equidistantly spaced hook points 18a, 18b, 18c, to and from which position the disc is more or less free to move by virtue of its loose fit on the hook shank or shaft 12. Even more important is that the plastic disc 20 when supported on the hook points as aforesaid provides an effective weed-guard for the said hooks 16a, 16b, 16c, capable of preventing snagging and/or fouling of said hooks or any one of them by or with weeds, lily pad roots and like marine growth when a lure carrying a treble hook having a disc attached to its shank is cast into water infested with such growth as aforesaid and particularly during retrieval of the lure.

In explanation, the continuous annular body of the plastic disc 20 extends fully across and substantially closes the openings to the hook concavities extending between hook shank 12 and the barbed hook points 18a, 18b, 18c thereof and is thus favorably positioned and disposed so as to divert weeds, grasses, roots and other marine growth which could otherwise snag or foul the hooks 16a–16c sidewardly of said hook points.

According to a further important feature of the invention, the outer-edge or skirt portion of the disc 20 throughout its full circumferential extent is rendered both flexible and readily penetrable by the barbed hook points 18a, 18b, 18c, or any one of them, through the provision of a multiplicity of closely-spaced slits 24 which extend from the outer edge 26 of the disc well into the body portion thereof. It will be noted that said slits, rather than extending radially inwardly as could result in the areas 28 of the disc between slits being substantially pie-shaped and hence susceptible to being readily torn or pulled away from the disc proper in use thereof, are instead so cut that they are substantially equally spaced from one another throughout their length which is such that their inner ends terminate well inwardly of the circle of the hook points 18a–18c inclusive. Thus, in the event of a fish taking the hook, the points of any one or all of the individual hooks 16a, 16b, 16c can and will freely pass through the slitted outer-edge or skirt portion of the disc, with the result that the hooks even though protected against fouling and snagging, function in the usual manner. That is to say, a treble hook with a weed guard 20 of the invention attached to its shank 12 in weed-diverting relation to the individual hooks thereof is just as capable of hooking a fish as a hook lacking the protection afforded by a weed-guard type disc as contemplated and provided by the present invention. In addition, by virtue of the disc being of clear plastic material, it detracts in no substantial way from the ability of the lure to whose treble-hook shank a plastic disc of the invention is attached as aforesaid to attract a fish when cast and particularly during its retrieval.

To enable its ready attachment to the shank of the treble hook of a lure at the will of a fisherman at the site of a desired cast and also to provide for its detachment therefrom when the need therefor appears to have been satisfied, the disc body portion, preferably during fabrication thereof, is split, i.e. cut apart, by a single non-radial line of cut 28 which, as is best seen in FIG. 3, extends inwardly from its outer peripheral edge 26 fully to the edge of the central hole 22. Thus, when attachment of the disc is decided upon, the fisherman merely spreads the cut-apart end portions of the disc about the hook shank 12 and then re-closes the disc.

Preferably, the line of cut 28 is so configured, being shown to be roughly volute or semi-circular, that when the disc is reclosed, it tends to stay closed without resort to any extraneous means. However, to insure against the disc being unintentionally pulled away from the hook shank following its attachment thereto as aforesaid, the invention also contemplates and provides a means for positively sealing the disc closed about the hook shank. Illustratively, such means takes the form of a semi-annular or substantially semi-annular strip 30 (FIGS. 1 and 4) of a textile material having on one face thereof a coating of waterproof adhesive protected as by a strip-off covering (the latter not shown). The semi-annular strip is of course sized so that upon stripping the protective covering from the adhesive and applying same to the preferably upper surface of the disc 20 following reclosing thereof about the hook shank as in FIG. 3, said strip adheres to the surface portions of the plastic disc disposed to both sides of its line of cut 28 and seals same closed. Obviously, when the need for guarding the hook against being fouled by weeds, etc. appears to have been satisfied, the disc 20 can be readily stripped from the hook shank and discarded.

At the present time, plastic-disc weed guards of the invention are being manufactured and packaged for sale in envelopes marked according to three sizes, designated A, B and C, with each size being designed for a particular range of lure hook sizes. The Size A weed guard has 1-inch outer-edge diameter and is thus suited for use with the Size 1/0, 1 and 2 lure hooks; the B guard has 13/16-inch outer-edge diameter and is thus suited for use with the Size 4, 6 and 8 lure hooks; and the C guard has ⅝-inch diameter and is thus suited for use with the Size 10 lure hooks.

The slits 24 which render the outer edge or skirt portion of the plastic disc both flexible and readily penetrable by the barbed hook points are 40–45 in number, are spaced apart 3/16 inch for the A weed guard, ⅛ inch for the B guard, and 1/16 inch for the C guard, and have length which varies from ¼-inch to ⅛-inch. However, it will be understood that the number of slits, their spacing and length may be varied in accordance with the particular fishing conditions anticipated to be encountered.

From the foregoing, it will be appreciated that a plastic disc-type weed guard according to the present invention may be inexpensively fabricated in quantity from sheet plastic, preferably a clear vinyl, by known stamping-out techniques; that its design and construction are such that it may be simply and readily attached to a hook shank and that it is not required to be attached to a hook shank (such as 12) in any particular angular position; and that it is fully effective and operative regardless of its position of orientation about the hook-shank axis for the entire time that it is so attached to said hook shank since its operability and effectiveness in nowise depends thereon.

Having described in the foregoing the preferred embodiment of my plastic disc type guard for fish hooks, what I claim is:

1. A weed guard for attachment to a fish hook of the type having a shank and a plurality of barbed hooks radiating outwardly therefrom and which terminate in spaced-apart hook points which are contained in a plane crossing the longitudinal axis of the shank and which are disposed radially outwardly from the shank axis, and comprising: a flexible planiform disc of thin sheet plastic, the disc having a diameter greater than that of the radial disposition of the hook points and a central opening for the passage therethrough of the hook shank, said disc normally resting at spaced points along its outer edge portion on the tip ends of said hook points, said opening being oversize with respect to the effective shank diameter, whereby when the disc is attached to the hook in full encircling relation about the shank it is free to ride loosely up and down the shank above said hook points, and a plurality of hook-point passage means in said outer edge portion of the disc throughout its full circumferential extent, said means imparting greater flexibility and hook penetrating properties than are present in the body portion of the disc.

2. A weed guard according to claim 1, wherein said means providing the greater flexibility and hook penetrability properties of the outer-edge portion of the disc includes a multiplicity of short-length, closely spaced slits which extend non-radially from the outer edge of the disc inwardly to the body portion thereof.

3. A weed guard according to claim 1, wherein said disc comprises a stamping of clear sheet vinyl.

4. A weed guard according to claim 1, wherein said disc comprises a stamping of clear sheet vinyl, and wherein said means providing the greater flexibility and hook penetrability properties of the outer peripheral portion of said disc includes a plurality of closely spaced, short-length slits which extend nonradially inwardly from said disc outer edge to said disc body portion.

5. A weed guard according to claim 1, wherein the continuity of the disc body and outer-edge portions is interrupted by a line of cut which extends non-radially inwardly from the outer edge of the disc to the edge of its central opening, as permits said disc to be spread apart and reclosed about the shank of said hook.

6. A weed guard according to claim 5, and wherein means are provided for sealing the disc re-closed about the shank.

7. A weedless treble-hook structure for fishing lures comprising a shank, a plurality of circumferentially spaced-apart barbed hooks extending radially from one end thereof and terminating in points, and a flexible disc having a central opening and surrounding said shank, said disc being freely slidable on said shank and being disposed above and in weed-guarding relationship to said barbed hooks, said disc normally resting on the points of said hooks and being normally substantially planiform and of thin plastic material and having a diameter such that its peripheral edge portion extends slightly beyond said barbed hooks, said edge portion having a plurality of hook-point passage means rendering said portion highly flexible and readily hook penetrable.

8. A hook structure according to claim 7, wherein said hook-point passage means of said disc are provided throughout the full extent of its peripheral edge portion and comprise a multiplicity of short-length, closely spaced, inwardly extending but non-radial slits which render said edge portion highly flexible and readily penetrable by said barbed hooks or any one thereof.

9. A hook structure according to claim 8, wherein said disc is provided with a non-radial line of cut which extends from its outer-edge periphery to said central opening, as enables said disc to be opened and thereupon re-closed about said shank.

10. A hook structure according to claim 9, wherein sealing means disposed to both sides of said line of cut maintain said disc closed about said shank.

* * * * *